United States Patent Office 3,375,067
Patented Mar. 26, 1968

3,375,067
BENEFICIATION OF PHOSPHATE ORE CONTAINING CARBONATES
Joseph F. Haseman, Lakeland, Fla., assignor, by mesne assignments, to Armour Agricultural Company, a corporation of Delaware
No Drawing. Filed Nov. 4, 1964, Ser. No. 408,748
5 Claims. (Cl. 23—165)

ABSTRACT OF THE DISCLOSURE

Phosphate ores high in carbonate minerals are calcined to change the carbonate minerals to oxides and cooled. The ores are then attritioned as by scrubbing, grinding, shaking, etc. to form a dry dust body, and the dust separated as dry dust by screening, air classification, etc. The phosphate ore remaining after separation from the dust is digested with acid for the production of wet process phosphoric acid, superphosphate fertilizer, etc. By removing the dust which contains the bulk of the carbonate materials in dry form, the acid-insoluble fraction is reduced and the acid requirements for phosphoric acid and fertilizer production are reduced.

---

This invention relates to the beneficiation of phosphate ore containing carbonates, and more particularly to the upgrading of phosphate ores that are high in carbonate impurities, such as limestone or dolomite, to raise the BPL grade of the ore and to reduce the acid requirements for wet phosphoric acid and superphosphate fertilizer production.

Many of the world's phosphate deposits are relatively high in carbonate minerals, which are primarily calcite and dolomite. While calcination is effective to upgrade the BPL in ores high in carbonates and organic impurities, this does not reduce the high acid requirements necessary for wet phosphoric acid production or production of superphosphate fertilizers. Calcination primarily changes the carbonate minerals to oxides, and partially or wholly reduces the organic and the hydrate content in the parent ore. To reduce acid consumption for phosphoric acid and fertilizer production, it is necessary to reduce these oxides, which are mainly calcium and magnesium oxides, and to remove them in such a manner so as not to increase the acid insoluble portion. Such oxides may be removed by the addition of water, boiling the water, and decanting the impurities in the form of slime suspended in water. However, this procedure results in an actual increase in the acid insoluble fraction and also requires dewatering and drying steps which are high in cost.

By the terms "acid consumption" and "high acid requirements," reference is made to the customary processes dealing with phosphate rock or ores in phosphoric acid production and the preparation of superphosphate. In such processes, sulfuric acid and phosphoric acid are used in a known manner.

A primary object of the present invention is to provide a process for the removal of carbonate and organic impurities in phosphate ore, while at the same time lowering the acid insoluble fraction therein. A further object is to provide a process for the beneficiation of phosphate rock containing carbonates and other impurities in the production of wet phosphoric acid or production of superphosphate fertilizers while avoiding the expensive steps of dewatering and drying the product. Other specific objects and advantages will appear as the specification proceeds.

The process is applicable to phosphate ore which assays more than about 3 percent $CO_2$, and the ore may contain a substantial amount of other impurities. In one embodiment of the process, the ore is calcined in conventional calcination equipment, such as, for example, a direct fired rotary kiln, fluid bed calciner, etc., or the like. Calcination temperatures may be in the range of 900° to 2500° F., and preferably in the range of 1200° to 1700° F. Rapid heating and cooling of the feed is favorable to subsequent beneficiation, but is not essential to the successful use of the process. After the calcining of the ore, the ore is subjected to attrition for the forming of a dust content, such attrition being produced by scrubbing or grinding or shaking, etc. It is found that the calcined material when subjected to substantial agitation yields a dust portion containing the main body of oxide impurities, and such dust may then be removed in a dedusting operation. The dedusting or separation of the dust from the phosphate ore material may be accomplished in a variety of ways, as, for example, by screening, air classification, and other well-known methods for separating dust from the body of particulate materials.

In the foregoing operation, I prefer to cool the calcined ore rapidly because the cooling tends to liberate and reduce in particle size the impurities and to cooperate with agitation in the attrition operation for producing the impurity-containing dust.

The phosphate ore after separation from the dust may then be subjected to standard ore dressing procedures for the removal of silicates and other impurities. Such standard separation operations include magnetic separation, separation in flotation systems, etc.

Specific examples illustrative of the process may be set out as follows:

*Example I*

Samples of pebble phosphate (—2+14 mesh) taken from the Lake Hancock mine in Florida were treated by heating 300 grams of the various samples at 1700° F. for one hour in a muffle furnace. The term "coarse" pebble includes samples that are essentially —2+4 mesh. "Fine" pebble is essentially —4+14 mesh. The calcined samples were air cooled, agitated by hand shaking for 3 minutes in a one-quart Mason jar, and the dust removed by screening. The results are shown in Table 1 herebelow:

TABLE 1

| Sample Number | Type of Pebble | Assay Before Calcination, Percent | | | Assay After Calcination, Percent | | | | Assay After Dedusting, Percent | | | Percent Recovery of Calcined Product | |
|---|---|---|---|---|---|---|---|---|---|---|---|---|---|
| | | BPL | Acid Insol. | $CO_2$ | BPL | Acid Insol. | $CO_2$ | MgO | BPL | Acid Insol. | MgO | Wt. | BPL |
| A | Coarse | 40.4 | 12.8 | 17.4 | 46.9 | 16.4 | 1.1 | 5.62 | 58.8 | 13.2 | 3.39 | 61.5 | 77.3 |
| B | do | 49.8 | 12.9 | 6.0 | 54.4 | 11.4 | 1.0 | 4.67 | 62.2 | 9.8 | 3.23 | 74.5 | 85.0 |
| C | do | 67.9 | 8.4 | 3.5 | 72.9 | 8.4 | 0.6 | ---- | 73.6 | 8.0 | ---- | 89.3 | 90.2 |
| D | do | 51.6 | 9.2 | 9.8 | 65.9 | 8.8 | 0.7 | 1.78 | 67.7 | 8.8 | 1.69 | 90.2 | 92.5 |
| E | do | 61.7 | 8.3 | 5.9 | 67.5 | 10.2 | 0.4 | 1.02 | 68.4 | 10.2 | 0.97 | 90.3 | 91.5 |
| F | do | 61.5 | 10.6 | 3.5 | 66.4 | 13.7 | 0.7 | 0.45 | 66.5 | 13.0 | 0.40 | 92.2 | 92.3 |
| G | Fine | 57.7 | 9.0 | 10.1 | 62.9 | 10.0 | 1.6 | ---- | 66.0 | 9.3 | ---- | 91.2 | 93.3 |
| H | do | 61.9 | 7.9 | 7.0 | 68.5 | 8.0 | 0.8 | ---- | 69.9 | 8.0 | ---- | 96.9 | 91.7 |
| I | do | 60.6 | 7.3 | 6.0 | 66.7 | 10.8 | 0.8 | 4.07 | 67.7 | 10.3 | 3.34 | 94.1 | 95.4 |

The results in Table 1 show a pronounced upgrading of high CO₂ samples when treated by the above process, while at the same time the acid-insoluble portion which had been increased by calcination was substantially reduced by the dedusting operation. The reduction in the acid-insoluble fraction reduced the requirements for acid in the later steps of phosphoric acid and fertilizer production.

*Example II*

The process was carried out as described in Example I except that instead of dedusting, the calcined ore was cooled and immersed in water, scrubbed with an agitator, and the fine liberated calcium and magnesium oxides were then removed by decantation through a 150-mesh screen. The results are shown in Table 2.

TABLE 2.—BENEFICIATION OF HIGH-CARBONATE FLORIDA PEBBLE PHOSPHATE BY CALCINATION AND SLAKING

| Sample Number | Type of Pebble | Essay Before Calcination, Percent | | | Assay After Calcination, Percent | | | Assay After Slaking, Percent | | | Percent Recovery of Calcined Product | |
|---|---|---|---|---|---|---|---|---|---|---|---|---|
| | | BPL | Acid Insol. | CO₂ | BPL | Acid Insol. | CaO | BPL | Acid Insol. | CaO | Wt. | BPL |
| 11 | +4 Mesh | 62.9 | 9.4 | 7.9 | 66.9 | 9.2 | 47.3 | 71.8 | 9.3 | 48.7 | 90.3 | 97.1 |
| S | +14 Mesh | 60.7 | 5.2 | 9.5 | 64.3 | 4.6 | | 74.5 | 4.9 | | 85.4 | 99.1 |
| G | Fine | 57.7 | 9.0 | 10.1 | 61.8 | 10.8 | | 64.6 | 11.2 | | 88.0 | 92.8 |
| H | do | 61.9 | 7.9 | 7.0 | 65.8 | 8.0 | | 69.4 | 8.2 | | 89.5 | 92.9 |

While an increase in BPL was obtained, it was found that the acid-insoluble portion present after the calcination was actually increased after the slaking operation. In comparison with the dedusting operation described in Example I, it was found that the dedusting procedure described in Example I was effective in decreasing the acid-insoluble fraction, while the water slaking procedure described in Example II increased the acid-insoluble fraction.

*Example III*

The process may be carried out as described in Example I except that after calcination, the ore is subjected to dry grinding and to air classification, the dust being sent to waste and the upgraded dust-free product being then subjected to further upgrading by standard ore dressing procedures for the removal of silicates and other impurities. The upgraded dust-free product responds readily to magnetic separation and air flotation in an aqueous system as commonly used for the removal of silicates and other impurities in standard ore dressing procedures. The phosphate concentrate then obtained is treated with sulfuric acid for the production of phosphoric acid, or, alternatively, is treated with phosphoric acid for the production of superphosphate.

While in the foregoing specification I have set forth embodiments of the invention in considerable detail for the purpose of illustrating the invention, it will be understood that such detail or details may be varied widely by those skilled in the art without departing from the spirit of my invention.

I claim:

1. In a process for treatment of phosphate ores containing carbonates to reduce acid requirements for phosphoric acid and fertilizer production, the steps of calcining the ores at a temperature in the range of 900° to 2500° F., attritioning the calcined ore to form a dry body of dust impurities, and separating said dust as dry dust from the phosphate ore.

2. The process of claim 1 in which said calcining step is carried on at temperatures in the range of 1200° to 1700° F.

3. In a process for the treatment of phosphate ores containing carbonates, the steps of calcining the ores at a temperature in the range of 900° to 2500° F., attritioning the calcined ore to form a body of dry dust impurities, separating said dust as dry dust from the phosphate ore, and subjecting the ore to acid treatment for the recovery of phosphoric acid.

4. The process of claim 1 in which the calcined ore is rapidly cooled before the ore is attritioned.

5. In a process for the acid digestion of phosphate ores containing carbonates to reduce the acid requirements for phosphoric acid and fertilizer production while decreasing the acid-insoluble fraction, the steps of calcining the ores at a temperature in the range of 900–2500° F., cooling the ore, crushing the calcined ore to produce dry dust, screening the crushed material to remove the dust as dry dust from the phosphate ore, and thereafter subjecting the ore to digestion with acid.

References Cited

UNITED STATES PATENTS

| | | | |
|---|---|---|---|
| 2,868,618 | 1/1959 | Oberg et al. | 23—165 X |
| 3,113,838 | 12/1963 | Perri et al. | 23—165 |
| 3,192,014 | 6/1965 | Leyshon et al. | 23—165 |
| 3,235,330 | 2/1966 | Lapple | 23—165 |

FOREIGN PATENTS 47,961   1/1964   Poland.

OSCAR R. VERTIZ, *Primary Examiner.*

A. J. GREIF, *Assistant Examiner.*